(12) United States Patent
Yang et al.

(10) Patent No.: US 12,438,908 B2
(45) Date of Patent: Oct. 7, 2025

(54) METHOD AND SYSTEM FOR DETECTING COMPLEX MULTI-STEP ATTACK IN ELECTRIC POWER SYSTEM

(71) Applicant: NANJING NARI INFORMATION & COMMUNICATION TECHNOLOGY CO., LTD., Jiangsu (CN)

(72) Inventors: Weiyong Yang, Jiangsu (CN); Haotian Zhang, Jiangsu (CN); Wei Liu, Jiangsu (CN); Xingshen Wei, Jiangsu (CN); Peng Gao, Jiangsu (CN); Yongjian Cao, Jiangsu (CN); Shishun Zhu, Jiangsu (CN); Chao Wu, Jiangsu (CN); Qiuhan Tian, Jiangsu (CN); Jian Zhou, Jiangsu (CN); Yiming Zhu, Jiangsu (CN); Longyun Qi, Jiangsu (CN); Yibin Huang, Jiangsu (CN); Zengzhou Ma, Jiangsu (CN); Huishui Li, Jiangsu (CN); Yongming Cao, Jiangsu (CN); Nannan Guo, Jiangsu (CN)

(73) Assignee: NANJING NARI INFORMATION & COMMUNICATION TECHNOLOGY CO., LTD., Nanjing (CN)

( * ) Notice: Subject to any disclaimer, the term of this patent is extended or adjusted under 35 U.S.C. 154(b) by 111 days.

(21) Appl. No.: 18/391,756

(22) Filed: Dec. 21, 2023

(65) Prior Publication Data
US 2024/0187446 A1    Jun. 6, 2024

Related U.S. Application Data

(63) Continuation of application No. PCT/CN2023/110080, filed on Jul. 31, 2023.

(30) Foreign Application Priority Data

Dec. 1, 2022   (CN) .......................... 202211526232.1

(51) Int. Cl.
*H04L 9/40*        (2022.01)

(52) U.S. Cl.
CPC ...... *H04L 63/1458* (2013.01); *H04L 63/1425* (2013.01)

(58) Field of Classification Search
CPC ........................ H04L 63/1425; H04L 63/1458
(Continued)

(56) References Cited

FOREIGN PATENT DOCUMENTS

| CN | 113094707 A | * | 7/2021 | ............. G06N 3/045 |
| CN | 115640510 A | * | 1/2023 | |

(Continued)

*Primary Examiner* — David P Zarka

(57) ABSTRACT

Disclosed are a method and system for detecting a complex multi-step attack in an electric power system. The method includes: collecting interaction behavior data of a network entity; preprocessing the interaction behavior data of the network entity based on a heterogeneous graph to obtain input data; and inputting the input data into a complex multi-step attack detection module to obtain an attack detection result. Information is extracted from the interaction behavior data to construct a node and an edge of the heterogeneous graph. Timestamp information of a destination node and an adjacent source node of the destination node is input into a Time2Vec layer to obtain a first time embedding representation. Data that fuses node feature information and the first time embedding representation is input into a Heteformer layer, and a second node embedding representation is obtained as input data and input into the complex multi-step attack detection module.

7 Claims, 5 Drawing Sheets

(58) Field of Classification Search
USPC .......................................................... 726/22
See application file for complete search history.

(56) References Cited

FOREIGN PATENT DOCUMENTS

| | | | | |
|---|---|---|---|---|
| CN | 119324807 A | * | 1/2025 | ............. H04L 67/12 |
| EP | 3841504 B1 | * | 12/2023 | ......... H04L 63/1425 |

* cited by examiner

| # Attention heads (LayerNorm) | Dataset division | # Training | # Verification | # Test | AUC (test) |
| --- | --- | --- | --- | --- | --- |
| 2 | 0.22:0.04:0.74 | 152 | 28 | 511 | 0.9400 |
| 8 | 0.22:0.04:0.74 | 152 | 28 | 511 | 0.9348 |
| 16 | 0.22:0.04:0.74 | 152 | 28 | 511 | 0.9400 |
| 32 | 0.22:0.04:0.74 | 152 | 28 | 511 | 0.9316 |

(a)
LayerNorm (2 attention heads, 2 Heteformer layers, and a LayerNorm layer)

(b)
LayerNorm (2 attention heads, 8, 16, and 32 Heteformer layers, and a LayerNorm layer)

| # Heteformer layers (LayerNorm) | Dataset division | # Training | # Verification | # Test | AUC (test) |
|---|---|---|---|---|---|
| 2 | 0.22:0.04:0.74 | 152 | 28 | 511 | 0.9400 |
| 8 | 0.22:0.04:0.74 | 152 | 28 | 511 | 0.9398 |
| 16 | 0.22:0.04:0.74 | 152 | 28 | 511 | 0.9401 |
| 32 | 0.22:0.04:0.74 | 152 | 28 | 511 | 0.9400 |

METHOD AND SYSTEM FOR DETECTING COMPLEX MULTI-STEP ATTACK IN ELECTRIC POWER SYSTEM

CROSS REFERENCE TO RELATED APPLICATIONS

The present application is a Continuation-in-part Application of PCT Application No. PCT/CN2023/110080 filed on Jul. 31, 2023, which claims the benefit of Chinese Patent Application No. 202211526232.1 filed on Dec. 1, 2022. All the above are hereby incorporated by reference in their entirety.

TECHNICAL FIELD

The present disclosure relates to the technical field of network security of an electric power system, and specifically, to a method and system for detecting a complex multi-step attack in an electric power system.

BACKGROUND

Complex multi-step attacks are long-term, covert, and highly destructive cyber attacks launched against governments, enterprises, and the like. As attack types change quickly, existing attacks are no longer just single-step attacks, but a combination of a plurality of complex attacks. An attacker intentionally makes an attack on a non-real target to distract and disrupt a defender's attention, thereby seizing the opportunity to make a covert attack on a real target. Therefore, one of effective methods for detecting the complex multi-step attack is to comprehensively monitor a behavior of an electric power system.

In recent years, for massive security data of a heterogeneous network, end-to-end detection methods based on deep learning have received increasing attention without a need for a feature engineering process. These methods have a certain generalization capability in the face of an unknown attack behavior because they are able to automatically learn a potential feature in data in an end-to-end manner. However, these methods still face a low detection success rate due to a long time interval of an Advanced Persistent Threat (APT) and other complex multi-step attacks, and an understated feature of a complex behavior.

SUMMARY

To overcome the defects in the prior art, the present disclosure provides a method and system for detecting a complex multi-step attack in an electric power system, to overcome a defect of a traditional neural network being unable to allocate a higher weight to an important connection relationship, and improve accuracy of complex multi-step attack detection.

In order to achieve the above objectives, the present disclosure adopts following technical solutions:

A first aspect provides a method for detecting a complex multi-step attack in an electric power system, including: collecting interaction behavior data of a network entity; preprocessing the interaction behavior data of the network entity based on a heterogeneous graph to obtain input data; and inputting the input data into a complex multi-step attack detection module to obtain an attack detection result.

Further, the collecting interaction behavior data of a network entity includes:

collecting a system log and a network behavior log, binding an Internet Protocol (IP) address to a Media Access Control (MAC) address of a host, and recording an interaction operation between hosts in an electric power system, and a network behavior of the host; and collecting a network connection relationship and information of internal staff of the system, binding the host to the staff information, and recording an operation between the staff and the host, and a network access behavior of the staff.

Further, the data preprocessing based on a heterogeneous graph includes: establishing the heterogeneous graph by using each of a user, the host, a file, and a website in the interaction behavior data of the network entity as a node and using a connection relationship between nodes as an edge; inputting timestamp information of a destination node and an adjacent source node of the destination node in the heterogeneous graph into a Time2Vec layer to obtain a first time embedding representation; and inputting data that fuses node feature information and the first time embedding representation into a Heteformer layer, allocating different weights based on different node types and edge types, learning, by using a self-attention mechanism, neighbor information that contributes the most to a complex multi-step attack detection task, and aggregating the neighbor information to obtain a second node embedding representation as the input data.

Further, the establishing the heterogeneous graph by using each of a user, the host, a file, and a website in the interaction behavior data of the network entity as a node and using a connection relationship between nodes as an edge includes: extracting information from the interaction behavior data of the network entity to construct node types and edge types, where the edge types include but are not limited to logging in to the host by the user, logging out of the host by the user, opening the file by the host, writing the file by the host, uploading the file to the website, downloading the file from the website, and accessing the website by the user; and extracting information from the interaction behavior data of the network entity to construct a node feature and an edge feature, where node features of the user include a username, a user group, and a user mailbox, node features of the host include an identity (ID) of the host, a model of the host, a region of the host, and a quantity of times that a Universal Serial Bus (USB) flash disk of the host is used, node features of the file include file creation time, file modification time, a file type, and a file name, and edge features of logging in to the host by the user and logging out of the host by the user include an authentication status code, an authentication event, and an authentication type.

Further, the inputting timestamp information of a destination node and an adjacent source node of the destination node in the heterogeneous graph into a Time2Vec layer to obtain a first time embedding representation includes: taking a destination IP address in the network behavior log as the destination node and a source IP address in the network behavior log as the source node, and subtracting the timestamp information of the source node adjacent to the destination node from the timestamp information of the destination node to obtain a time difference sequence; inputting the time difference sequence into the Time2Vec layer to obtain a time representation in a form of an embedding vector; and inputting the embedding vector into a linear layer to linearly map the embedding vector back to an original dimension as a time feature of the destination node, in other words, the first time embedding representation.

Further, the inputting data that fuses node feature information and the first time embedding representation into a Heteformer layer to obtain an attention score includes:

$$\text{Attention}(src, dst) = \underset{\forall src \in N(dst)}{\text{Softmax}}\left(\underset{i \in [1,m]}{\|} A^i_{head}(src, dst)\right) \quad (1)$$

$$A^i_{head}(src, dst) = \frac{(K^i(src_n)Q^i(dst_n))}{\sqrt{d}} \quad (2)$$

$$K^i(src_n) = K - \text{linear} - \text{node}^i(H^{(l-1)}[src]) \quad (3)$$

$$Q^i(dst_n) = Q - \text{linear} - \text{node}^i(H^{(l-1)}[dst]) \quad (4)$$

$$\text{Attention}(src, e, dst) = \underset{\forall src \in N(dst)}{\text{Softmax}}\left(\underset{i \in [1,m]}{\|} A^i_{head}(src, e, dst)\right) \quad (5)$$

$$A^i_{head}(src, e, dst) = \frac{(K^i(e)W^A_e Q^i(dst_n))}{\sqrt{d}} \quad (6)$$

$$K^i(e) = K - \text{linear} - \text{edge}^i(H^{(l-1)}[e]) \quad (7)$$

where d represents a node feature dimension, src represents the source node, dst represents the destination node, e represents the edge, i represents an $i^{th}$ attention head, m represents a total quantity of attention heads, $\forall src \in N(dst)$ represents all source nodes connected to the destination node, $A_{head}^i$ represents an attention score of the $i^{th}$ attention head, $K^i(src_n)$ represents a key-node vector, $Q^i(dst_n)$ represents a query vector, $K^i(e)$ represents a key-edge vector, K-linear-node$^i$ represents a linear layer for mapping a feature of the source node, Q-linear-node$^i$ represents a linear layer for mapping a feature of the destination node, K-linear-edge$^i$ represents a linear layer for mapping an edge feature, $H^{(l-1)}[src]$ represents an embedding representation of the source node in an $(l-1)^{th}$ layer, $H^{(l-1)}[dst]$ represents an embedding representation of the destination node in the $(l-1)^{th}$ layer, $H^{(l-1)}[e]$ represents an embedding representation of the edge in the $(l-1)^{th}$ layer, $W^A_e$ represents a weight matrix of the corresponding edge, which is determined based on a type of the edge, Attention(src, dst) represents a node attention score obtained after a plurality of attention heads are concatenated and undergo softmax normalization, and Attention(src, e, dst) represents an edge attention score obtained after the plurality of attention heads are concatenated and undergo the softmax normalization;

linearly mapping the embedding representation $H^{(l-1)}[dst]$ of the destination node in the $(l-1)^{th}$ layer into the query vector $Q^i(dst_n)$ through Q-linear-node according to the formula (4);

linearly mapping the embedding representation $H^{(l-1)}[src]$ of the source node in the $(l-1)^{th}$ layer into the key-node vector $K^i(src_n)$ through K-linear-node$^i$ according to the formula (3);

according to the formula (2), calculating a dot product value between $K^i(src_n)$ and $Q^1(dst_n)$, and dividing the dot product value by a square root of the node feature dimension d to obtain a node attention score $A_{head}^i$ for each attention head;

according to the formula (1), finally concatenating the attention score $A_{head}^i$ of each attention head, and performing softmax calculation to obtain an attention score $A_{head}^i(src, dst)$ of the node; and similarly, obtaining an attention score Attention(src, e, dst) of the edge.

Further, the learning, by using a self-attention mechanism, neighbor information that contributes the most to a complex multi-step attack detection task includes:

$$\text{Message}(src, dst) = \underset{i \in [1,m]}{\|} M^i_{head-node} \quad (8)$$

$$M^i_{head-node} = V - \text{linear} - \text{node}^i(H^{(l-1)}[src])W^M_n \quad (9)$$

$$\text{Message}(src, e, dst) = \underset{i \in [1,m]}{\|} M^i_{head-edge} \quad (10)$$

$$M^i_{head-edge} = V - \text{linear} - \text{edge}^i(H^{(l-1)}[e])W^M_e \quad (11)$$

where $M_{head-node}^i$ represents a value-node vector of the $i^{th}$ attention head of the node feature, $M_{head-edge}^i$ represents a value-edge vector of the $i^{th}$ attention head of the edge feature, V-linear-node$^i$ represents a linear layer for mapping the feature of the source node, V-linear-edge$^i$ represents a linear layer for mapping the feature of the edge, $W_n^M$ represents a weight matrix of a value-node vector of the node feature, $W_e^M$ represents a weight matrix of an edge-node vector of the edge feature, Message(src, dst) represents a concatenation representation of value-node vectors of m attention heads, Message(src, e, dst) represents a concatenation representation of value-edge the m attention heads, $H^{(l-1)}[src]$ represents the embedding representation of the source node in the $(l-1)^{th}$ layer, and $H^{(l-1)}[e]$ represents the embedding representation of the edge in the $(l-1)^{th}$ layer;

linearly mapping the feature $H^{(l-1)}[src]$ of the source node through V-linear-node$^i$ according to the formula (9), and allocating different weight matrices $W_n^M$ to different types of source nodes to obtain a value-node vector $M_{head-node}^i$ of an attention head; and concatenating value-node vectors $Mh_{head-node}^i$ of all the attention heads according to the formula (8) to obtain the concatenation representation Message(src, dst) of the value-node vectors of the attention heads; and similarly, obtaining the concatenation representation Message(src, e, dst) of the value-edge vectors of the attention heads.

Further, a specific calculation process of aggregating the neighbor information to obtain the second node embedding representation as the input data is as follows:

$$H^i[dst] = \underset{\forall src \in N(dst)}{\bigoplus} (\text{Attention}(src, dst) \cdot \text{Message}(src, dst), \quad (12)$$

$$\text{Attention}(src, e, dst) \cdot \text{Message}(src, e, dst))$$

where $H^l[dst]$ represents a second node embedding representation of the destination node in an $l^{th}$ layer;

aggregating neighbor information of the destination node by using an attention weight coefficient according to the formula (12), and calculating a dot product value between the node attention score Attention(src, dst) and the concatenation representation Message(src, dst) of the value-node vectors of the attention heads;

calculating a dot product value between the edge attention score Attention(src, e, dst) and the concatenation representation Message(src, e, dst) of the value-edge vectors of the attention heads; and accumulating all product results to obtain the second node embedding representation of the destination node.

Further, the complex multi-step attack detection module takes the second node embedding representation as an input, and obtains the attack detection result in a binary classification form through the linear layer and a softmax layer.

A second aspect provides a system for detecting a complex multi-step attack in an electric power system, including: a data collection module configured to collect interaction behavior data of a network entity; a data processing module configured to preprocess the interaction behavior data of the network entity based on a heterogeneous graph to obtain input data; and an attack detection module configured to input the input data into a complex multi-step attack detection module to obtain an attack detection result.

Compared with the prior art, the present disclosure has following beneficial effects: The present disclosure collects interaction behavior data of a network entity; preprocesses the interaction behavior data of the network entity based on a heterogeneous graph; extracts information from the interaction behavior data to construct a node and an edge of the heterogeneous graph; inputs timestamp information of a destination node and an adjacent source node of the destination node into a Time2Vec layer to obtain a first time embedding representation; inputs data that fuses node feature information and the first time embedding representation into a Heteformer layer to obtain a second node embedding representation; and inputs the second node embedding representation into a complex multi-step attack detection module as input data to obtain an attack detection result. This overcomes a defect of a traditional neural network being unable to allocate a higher weight to an important connection relationship, and improves accuracy of complex multi-step attack detection.

DETAILED DESCRIPTION

The prevent disclosure is further described below with reference to the accompanying drawings. The following embodiments are only used for describing the technical solutions of the present disclosure more clearly, and are not intended to limit the protection scope of the present disclosure.

Embodiment 1

As shown in FIG. 1 to FIG. 5, a method for detecting a complex multi-step attack in an electric power system includes: collecting interaction behavior data of a network entity; preprocessing the interaction behavior data of the network entity based on a heterogeneous graph to obtain input data; and inputting the input data into a complex multi-step attack detection module to obtain an attack detection result.

The interaction behavior data of the network entity is collected.

Step 1: Collect the interaction behavior data of the network entity. This step includes: collecting a system log and a network behavior log, binding an IP address to a MAC address of a host, and recording an interaction operation between hosts in an electric power system, and a network behavior of the host; and collecting a network connection relationship and information of internal staff of the system, binding the host to the staff information, and recording an operation between the staff and the host, and a network access behavior of the staff.

The interaction behavior data of the network entity is preprocessed based on the heterogeneous graph to obtain the input data.

Step 2: Extract information from the interaction behavior data of the network entity to construct a node and an edge. This step includes establishing the heterogeneous graph by using each of a user, the host, a file, and a website in the interaction behavior data of the network entity as the node and using a connection relationship between nodes as the edge.

Figure 1:
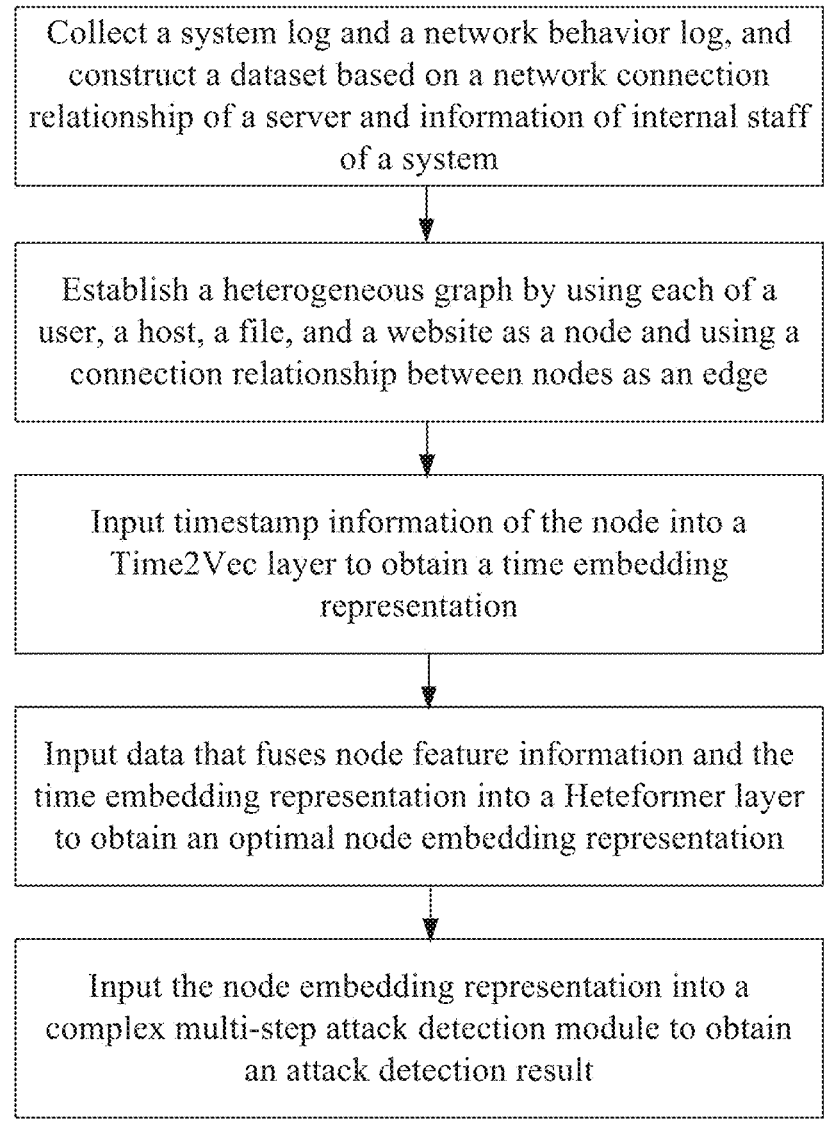
FIG. 1 is a schematic flowchart of a method for detecting a complex multi-step attack in an electric power system according to an embodiment of the present disclosure.
Figure 2:
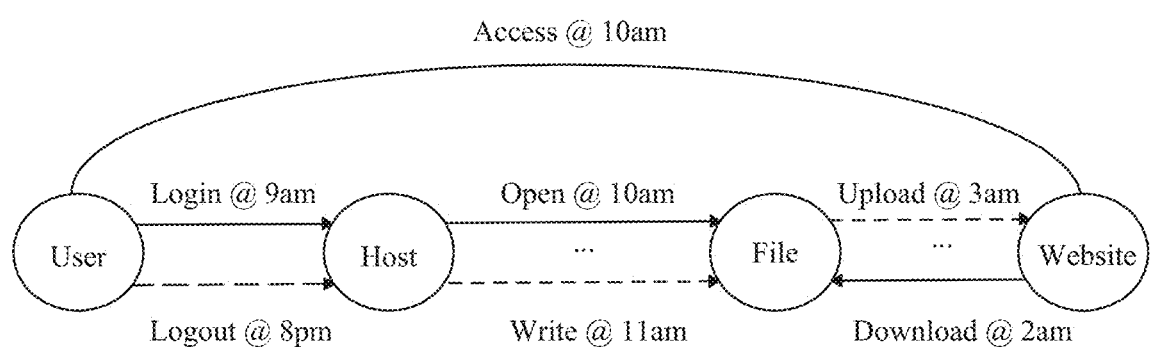
FIG. 2 is a schematic diagram of a method for constructing a heterogeneous graph according to an embodiment of the present disclosure.

As shown in FIG. 2, a concept of the heterogeneous graph is first defined by using a source IP address as a source node, a destination IP address as a destination node, and a connection relationship between the source node and the destination node as the edge. Therefore, a meta relationship can be represented by a triplet of <source node, edge, destination node>. There are a plurality of types of source nodes, destination nodes, and edges. A timestamp of event occurrence time is allocated to each triplet to reflect a dynamic feature, thereby forming a quadruple notation of <source node, edge, destination node, timestamp>. Specifically, following content is included:

(2-1) Extract information from the interaction behavior data of the network entity to construct node types and edge types. The node types include the user, the host, the file, and the website. The edge types include but are not limited to logging in to the host by the user, logging out of the host by the user, opening the file by the host, writing the file by the host, uploading the file to the website, downloading the file from the website, and accessing the website by the user.

(2-2) Extract information from the interaction behavior data of the network entity to construct a node feature and an edge feature. Node features of the user include a username, a user group, and a user mailbox. Node features of the host include a device ID of the host, a device model of the host, a region of the host, and a quantity of times that a USB flash disk of the host is used. Node features of the file include file creation time, file modification time, a file type, and a file name. Edge features of logging in to the host by the user and logging out of the host by the user include an authentication status code, an authentication event, and an authentication type.

Final input data is related features and timestamp information of the destination node and an adjacent source node of the destination node, where the input data is in a form of <ID of the source node, ID of the destination node, type of the source node, type of the destination node, feature of the source node, feature of the destination node, edge type, edge feature, timestamp>.

Step 3: Input the timestamp information of the destination node and the adjacent source node of the destination node in the heterogeneous graph into a Time2Vec layer to obtain a first time embedding representation.

(3-1) Take the destination IP address in the network behavior log as the destination node and the source IP address in the network behavior log as the source node, and subtract the timestamp information of the source node adjacent to the destination node from the timestamp information of the destination node to obtain a time difference sequence; represent the source node src and its corresponding timestamp ts by T(src@ts), and the destination node dst and its corresponding timestamp td by (dst@td); and calculate a relative time interval according to ΔT(dst@ts, src@td) =T(dst@ts)−T(src@td). For ease of description, the relative time interval is represented by the ΔT (time difference sequence).

(3-2) Input the time difference sequence into the Time2Vec layer to obtain a time representation in a form of an embedding vector, input the ΔT into the Time2Vec layer to obtain first time embedding representations of the source node and the destination node at a current time point, and input the embedding vector into a linear layer to linearly map the embedding vector back to an original dimension as a time feature of the destination node, in other words, the first time embedding representation.

Step 4: Input data that fuses node feature information and the first time embedding representation into a Heteformer layer. A Heteformer is a new deep learning model for processing the heterogeneous graph in the present disclosure. The Heteformer layer is used to better extract semantic information contained in a heterogeneous node and a heterogeneous edge in the heterogeneous graph to form a node embedding representation for each node, and provide an input for a downstream task. A specific calculation process of the Heteformer layer includes: allocating different weights based on different node types and edge types, learning, by using a self-attention mechanism, neighbor information that contributes the most to a complex multi-step attack detection task, and aggregating the neighbor information to obtain a second node embedding representation as the input data.

(4-1) Input the data that fuses the node feature information and the first time embedding representation into the Heteformer layer, and allocate different weights based on different node types and edge types. An attention score is calculated to obtain importance of source nodes with different edge types and connected to the destination node. The feature of the destination node is linearly mapped into a query vector through a linear layer, the feature of the source node is linearly mapped into a key-node vector through a linear layer, and the edge feature is linearly mapped into a key-edge vector through a linear layer. Different weight matrices are allocated to different types of source nodes and edges. Point multiplication is performed on the query vector, the weight matrix, and the key-node vector, and on the query vector, the weight matrix, and the key-edge vector. Point product results are input into a softmax layer for normalization to obtain the attention score.

A specific process of calculating the attention score to obtain the importance of the source nodes with different edge types and connected to the destination node is as follows:

$$\text{Attention}(src, dst) = \underset{\forall src \in N(dst)}{\text{Softmax}} \left( \underset{i \in [1,m]}{\|} A^i_{head}(src, dst) \right) \quad (1)$$

$$A^i_{head}(src, dst) = \frac{\left(K^i(src_n) Q^i(dst_n)\right)}{\sqrt{d}} \quad (2)$$

$$K^i(src_n) = K-\text{linear}-\text{node}^i\left(H^{(l-1)}[src]\right) \quad (3)$$

$$Q^i(dst_n) = Q-\text{linear}-\text{node}^i\left(H^{(l-1)}[dst]\right) \quad (4)$$

$$\text{Attention}(src, e, dst) = \underset{\forall src \in N(dst)}{\text{Softmax}} \left( \underset{i \in [1,m]}{\|} A^i_{head}(src, e, dst) \right) \quad (5)$$

$$A^i_{head}(src, e, dst) = \frac{\left(K^i(e) W^A_e Q^i(dst_n)\right)}{\sqrt{d}} \quad (6)$$

$$K^i(e) = K-\text{linear}-\text{edge}^i\left(H^{(l-1)}[e]\right) \quad (7)$$

In the above formulas, d represents a node feature dimension, src represents the source node, dst represents the destination node, e represents the edge, i represents an $i^{th}$ attention head, m represents a total quantity of attention heads, $\forall src \in N(dst)$ represents all source nodes connected to the destination node, $A_{head}^i$ represents an attention score of the $i^{th}$ attention head, $K^i(src_n)$ represents the key-node vector, $Q^i(dst_n)$ represents the query vector, $K^i(e)$ represents the key-edge vector, K-linear-node$^i$ represents the linear layer for mapping the feature of the source node, Q-linear-node$^i$ represents the linear layer for mapping the feature of the destination node, K-linear-edge$^i$ represents the linear layer for mapping the edge feature, $H^{(l-1)}[src]$ represents an embedding representation of the source node in an $(l-1)^{th}$ layer, $H^{(l-1)}[dst]$ represents an embedding representation of the destination node in the $(l-1)^{th}$ layer, $H^{(l-1)}[e]$ represents an embedding representation of the edge in the $(l-1)^{th}$ layer, $W_e^A$ represents a weight matrix of the corresponding edge, which is determined based on a type of the edge, Attention (src, dst) represents a node attention score obtained after a plurality of attention heads are concatenated and undergo softmax normalization, and Attention(src, e, dst) represents an edge attention score obtained after the plurality of attention heads are concatenated and undergo the softmax normalization.

(4-2) Learn, by using the self-attention mechanism, the neighbor information that contributes the most to the complex multi-step attack detection task. Node information is transferred to extract the feature of the source node and the edge feature. The feature of the source node is linearly mapped into a value-node vector, and the edge feature is linearly mapped into a value-edge vector. Different weight matrices are allocated to different types of source nodes and edges.

A specific calculation process of learning, by using the self-attention mechanism, the neighbor information that contributes the most to the complex multi-step attack detection task is as follows:

$$\text{Message}(src, dst) = \underset{i \in [1,m]}{\|} M^i_{head-node} \quad (8)$$

$$M^i_{head-node} = V-\text{linear}-\text{node}^i\left(H^{(l-1)}[src]\right) W^M_n \quad (9)$$

-continued $$\text{Message}(src, e, dst) = \underset{i \in [1,m]}{\|} M^i_{head-edge} \tag{10}$$

$$M^i_{head-edge} = V-\text{linear}-\text{edge}^i(H^{(l-1)}[e])W^M_e \tag{11}$$

In the above formulas, $M_{head-node}{}^i$ represents a value-node vector of the $i^{th}$ attention head of the node feature, $M_{head-edge}{}^i$ represents a value-edge vector of the $i^{th}$ attention head of the edge feature, V-linear-node$^i$ represents a linear layer for mapping the feature of the source node, V-linear-edge$^i$ represents a linear layer for mapping the feature of the edge, $W_n{}^M$ represents a weight matrix of a value-node vector of the node feature, $W_e{}^M$ represents a weight matrix of an edge-node vector of the edge feature, Message(src, dst) represents a concatenation representation of value-node vectors of m attention heads, Message(src, e, dst) represents a concatenation representation of value-edge vectors of the m attention heads, $H^{(l-1)}$[src] represents the embedding representation of the source node in the $(l-1)^{th}$ layer, and $H^{(l-1)}$[e] represents the embedding representation of the edge in the $(l-1)^{th}$ layer.

(4-3) Aggregate the neighbor information to obtain an optimal node embedding representation. The node information is aggregated. The neighbor information of the destination node is aggregated based on the attention weight coefficient. The attention score is separately multiplied by the value-node vector and the value-edge vector, and product results of all the source nodes are accumulated to obtain a second node embedding representation of the destination node as the input data.

A specific calculation process of aggregating the neighbor information to obtain the optimal node embedding representation is as follows:

$$H^l[dst] = \underset{\forall src \in N(dst)}{\bigoplus} (\text{Attention}(src, dst) \cdot \text{Message}(src, dst), \tag{12}$$

$$\text{Attention}(src, e, dst) \cdot \text{Message}(src, e, dst))$$

In the above formula, $H^l$[dst] represents an embedding representation of the destination node in an $l^{th}$ layer, Attention(src, dst) represents the node attention score obtained after the plurality of attention heads are concatenated and undergo the softmax normalization, Attention(src, e, dst) represents the edge attention score obtained after the plurality of attention heads are concatenated and undergo the softmax normalization, Message(src, dst) represents the concatenating representation of the value-node vectors of the m attention heads, and Message(src, e, dst) represents the concatenating representation of the value-edge vectors of the m attention heads.

The input data is input into the complex multi-step attack detection module to obtain the attack detection result.

Step 5: Perform attack detection. In a training phase, an encoder utilizes a cross entropy loss function for backpropagation to update model parameters and obtain the optimal embedding representation. In a test phase, the embedding representation is input into the linear layer and the softmax layer to obtain the attack detection result in a binary classification form.

Figure 3:
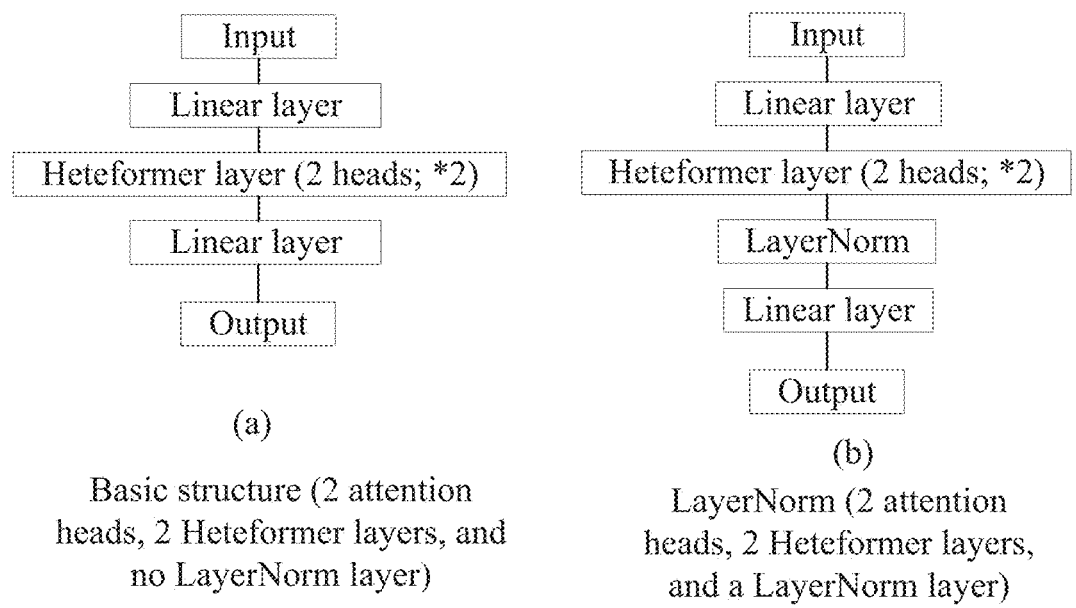
FIG. 3 shows an experimental result of a first type of model parameters when detection is performed by using a method for detecting a complex multi-step attack in an electric power system according to an embodiment of the present disclosure.
Figure 4:
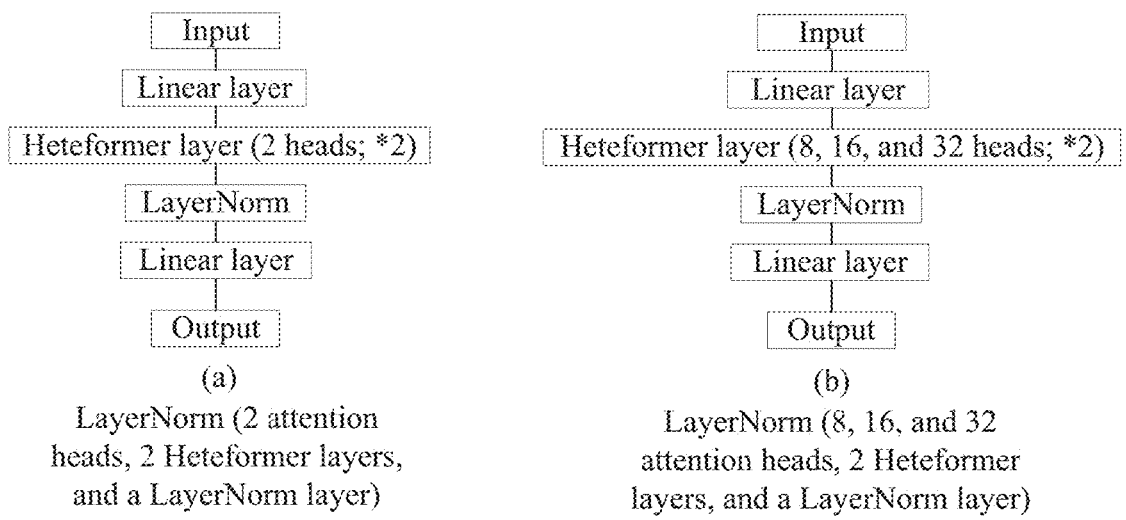
FIG. 4 shows an experimental result of a second type of model parameters when detection is performed by using a method for detecting a complex multi-step attack in an electric power system according to an embodiment of the present disclosure.
Figure 5:
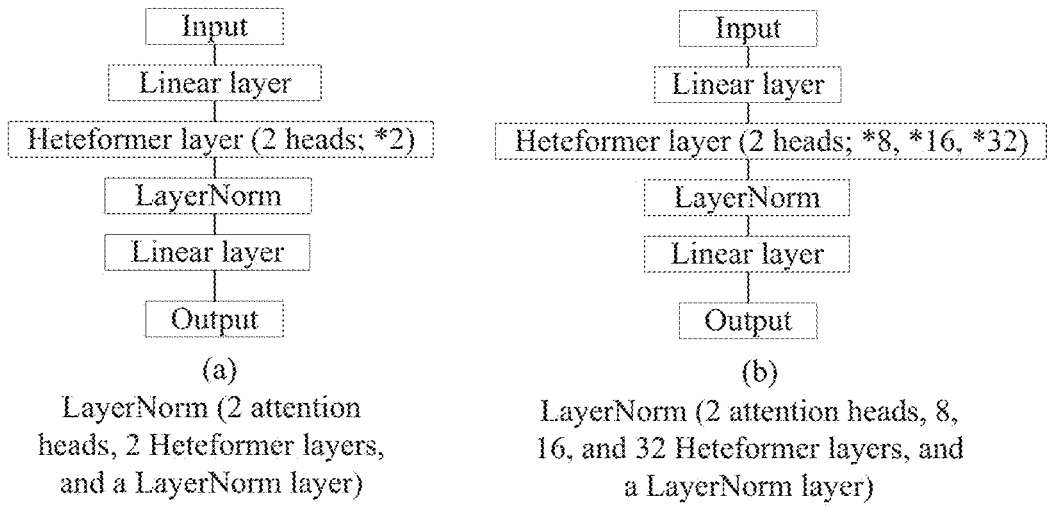
FIG. 5 shows an experimental result of a third type of model parameters when detection is performed by using a method for detecting a complex multi-step attack in an electric power system according to an embodiment of the present disclosure.

As shown in FIG. 3 to FIG. 5, FIG. 3 shows an experimental result of a first type of model parameters when detection is performed by using the method for detecting a complex multi-step attack in an electric power system according to an embodiment of the present disclosure. After a LayerNorm layer is added to normalize layer data, an impact of a quantity of dimensions between data is eliminated, and a recognition effect can be effectively improved by about 2.8%. FIG. 4 shows an experimental result of a second type of model parameters when detection is performed by using the method for detecting a complex multi-step attack in an electric power system according to an embodiment of the present disclosure. When a quantity of attention heads increases, a recognition result may fluctuate slightly. Basically, an effective feature of the data can be effectively extracted by using two attention heads. FIG. 5 shows an experimental result of a third type of model parameters when detection is performed by using the method for detecting a complex multi-step attack in an electric power system according to an embodiment of the present disclosure. When a quantity of Heteformer convolutional layers increases, a detection effect is not significantly affected, which indicates that a shallow network structure can already learn the effective feature.

Embodiment 2

Figure 6:
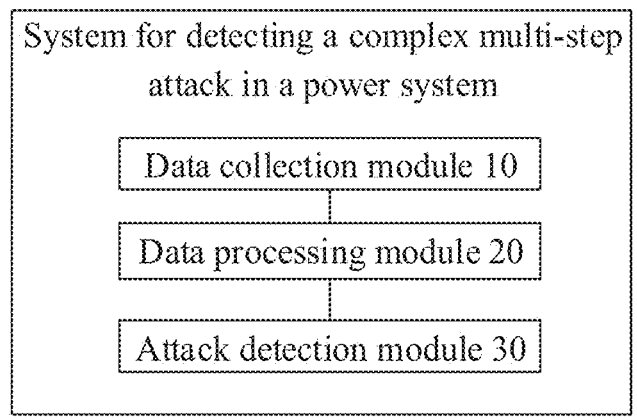
FIG. 6 is a structural block diagram of a system for detecting a complex multi-step attack in an electric power system according to an embodiment of the present disclosure.

As shown in FIG. 6, based on the method for detecting a complex multi-step attack in an electric power system, this embodiment provides a system for detecting a complex multi-step attack in an electric power system, including: a data collection module 10 configured to collect interaction behavior data of a network entity; a data processing module 20 configured to preprocess the interaction behavior data of the network entity based on a heterogencous graph to obtain input data; and an attack detection module 30 configured to input the input data into a complex multi-step attack detection module to obtain an attack detection result.

In this embodiment of the present disclosure, the data collection module 10, the data processing module 20, the attack detection module 30, and the complex multi-step attack detection module cach may be one or more processors, controllers, or chips that each have a communication interface, can realize a communication protocol, and may further include a memory, a related interface and system transmission bus, and the like if necessary. The processor, controller or chip executes program-related code to implement a corresponding function. In an alternative solution, the data collection module 10, the data processing module 20, the attack detection module 30, and the complex multi-step attack detection module share an integrated chip or share devices such as a processor, a controller, and a memory. The shared processor, controller or chip executes program-related code to implement a corresponding function.

The embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code. The solutions in the embodiments of the present disclosure can be implemented in various computer languages, such as an object-oriented programming language Java and a literal script language JavaScript.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct a computer or another programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, those skilled in the art can make changes and modifications to these embodiments once they learn the basic inventive concept. Therefore, the appended claims are intended to be interpreted as including the preferred embodiments and all changes and modifications falling within the scope of the present disclosure.

Apparently, a person skilled in the art can make various changes and modifications to the present disclosure without departing from the spirit and scope of the present disclosure. Therefore, the present disclosure is intended to cover these modifications and variations provided that they fall within the scope of the claims of the present disclosure and their equivalent technologies.

The invention claimed is:

1. A method for detecting a complex multi-step attack in an electric power system, comprising:
    collecting interaction behavior data of a network entity;
    preprocessing the interaction behavior data of the network entity based on a heterogeneous graph to obtain input data; and
    inputting the input data into a complex multi-step attack detection module to obtain an attack detection result;
    wherein the preprocessing the interaction behavior data of the network entity based on a heterogeneous graph comprises:
    extracting information from the interaction behavior data of the network entity to construct a node and an edge, which comprises establishing the heterogeneous graph by using each of a user, a host, a file, and a website in the interaction behavior data of the network entity as the node and using a connection relationship between nodes as the edge;
    firstly defining a concept of the heterogeneous graph by using a source Internet Protocol (IP) address as a source node, a destination IP address as a destination node, and a connection relationship between the source node and the destination node as the edge, wherein a meta relationship is represented by a triplet of <source node, edge, destination node>; there are a plurality of types of source nodes, destination nodes, and edges; a timestamp of event occurrence time is allocated to each triplet to reflect a dynamic feature, thereby forming a quadruple notation of <source node, edge, destination node, timestamp>; and specifically, following content is comprised:
    extracting information from the interaction behavior data of the network entity to construct node types and edge types, wherein the node types comprise the user, the host, the file, and the website, and the edge types comprise logging in to the host by the user, logging out of the host by the user, opening the file by the host, writing the file by the host, uploading the file to the website, downloading the file from the website, and accessing the website by the user; and
    extracting information from the interaction behavior data of the network entity to construct a node feature and an edge feature, wherein node features of the user comprise a username, a user group, and a user mailbox; node features of the host comprise a device identity (ID) of the host, a device model of the host, a region of the host, and a quantity of times that a Universal Serial Bus (USB) flash disk of the host is used; node features of the file comprise file creation time, file modification time, a file type, and a file name; and edge features of logging in to the host by the user and logging out of the host by the user comprise an authentication status code, an authentication event, and an authentication type; and
    determining that final input data is related features and timestamp information of the destination node and an adjacent source node of the destination node, wherein the input data is in a form of <ID of the source node, ID of the destination node, type of the source node, type of the destination node, feature of the source node, feature of the destination node, edge type, edge feature, timestamp>;
    inputting the timestamp information of the destination node and the adjacent source node of the destination node in the heterogeneous graph into a Time2Vec layer to obtain a first time embedding representation, which comprises:
    taking the destination IP address in a network behavior log as the destination node and the source IP address in the network behavior log as the source node, and subtracting the timestamp information of the source node adjacent to the destination node from the timestamp information of the destination node to obtain a time difference sequence; representing the source node src and its corresponding timestamp ts by T(src@ts), and the destination node dst and its corresponding timestamp td by T(dst@td); and calculating a relative time interval according to $\Delta T(dst@ts, src@td) = T(dst@ts) - T(src@td)$, wherein the relative time interval is represented by the time difference sequence $\Delta T$;
    inputting the time difference sequence into the Time2Vec layer to obtain a time representation in a form of an embedding vector, inputting the $\Delta T$ into the Time2Vec layer to obtain first time embedding representations of the source node and the destination node at a current time point, and inputting the embedding vector into a linear layer to linearly map the embedding vector back to an original dimension as a time feature of the destination node, in other words, the first time embedding representation; and inputting data that fuses node feature information and the first time embedding representation into a Heteformer layer, wherein a Heteformer is a deep learning model for processing the heterogeneous graph; the Heteformer layer is used to extract semantic information contained in a heterogeneous node and a heterogeneous edge in the heterogeneous graph to form a node embedding representation for each node, and provide an input for a downstream task; a specific calculation process of the Heteformer layer comprises: allocating different weights based on different node types and edge types, learning, by using a self-attention mechanism, neighbor information that contributes the most to a complex multi-step attack detection task, and aggregating the neighbor information to obtain a second node embedding representation as the input data.

2. The method for detecting a complex multi-step attack in an electric power system according to claim 1, wherein the collecting interaction behavior data of a network entity comprises:

collecting a system log and the network behavior log, binding an IP address to a Media Access Control (MAC) address of the host, and recording an interaction operation between hosts in an electric power system, and a network behavior of the host; and collecting a network connection relationship and information of internal staff of the system, binding the host to the staff information, and recording an operation between the staff and the host, and a network access behavior of the staff.

3. The method for detecting a complex multi-step attack in an electric power system according to claim 1, wherein the inputting data that fuses node feature information and the first time embedding representation into a Heteformer layer to obtain an attention score comprises:

$$\text{Attention}(src, dst) = \underset{\forall src \in N(dst)}{Softmax} \left( \underset{i \in [1,m]}{\|} A^i_{head}(src, dst) \right) \quad (1)$$

$$A^i_{head}(src, dst) = \frac{(K^i(src_n)Q^i(dst_n))}{\sqrt{d}} \quad (2)$$

$$K^i(src_n) = K - \text{linear} - \text{node}^i(H^{(l-1)}[src]) \quad (3)$$

$$Q^i(dst_n) = Q - \text{linear} - \text{node}^i(H^{(l-1)}[dst]) \quad (4)$$

$$\text{Attention}(src, e, dst) = \underset{\forall src \in N(dst)}{Softmax} \left( \underset{i \in [1,m]}{\|} A^i_{head}(src, e, dst) \right) \quad (5)$$

$$A^i_{head}(src, e, dst) = \frac{(K^i(e)W_e^A Q^i(dst_n))}{\sqrt{d}} \quad (6)$$

$$K^i(e) = K - \text{linear} - \text{edge}^i(H^{(l-1)}[e]) \quad (7)$$

wherein d represents a node feature dimension, src represents the source node, dst represents the destination node, e represents the edge, i represents an $i^{th}$ attention head, m represents a total quantity of attention heads, $\forall src \in N(dst)$ represents all source nodes connected to the destination node, $A^i_{head}$ represents an attention score of the $i^{th}$ attention head, $K^i(src_n)$ represents a key-node vector, $Q^i(dst_n)$ represents a query vector, $K^i(e)$ represents a key-edge vector, K-linear-node represents a linear layer for mapping a feature of the source node, Q-linear-node represents a linear layer for mapping a feature of the destination node, K-linear-edge represents a linear layer for mapping an edge feature, $H^{(l-1)}[src]$ represents an embedding representation of the source node in an $(l-1)^{th}$ layer, $H^{(l-1)}[dst]$ represents an embedding representation of the destination node in the $(l-1)^{th}$ layer, $H^{(l-1)}[e]$ represents an embedding representation of the edge in the $(l-1)^{th}$ layer, $W_e^A$ represents a weight matrix of the corresponding edge, which is determined based on a type of the edge, Attention(src, dst) represents a node attention score obtained after a plurality of attention heads are concatenated and undergo softmax normalization, and Attention(src, e, dst) represents an edge attention score obtained after the plurality of attention heads are concatenated and undergo the softmax normalization;

linearly mapping the embedding representation $H^{(l-1)}[dst]$ of the destination node in the $(l-1)^{th}$ layer into the query vector $Q^i(dst_n)$ through Q-linear-node according to the formula (4);

linearly mapping the embedding representation $H^{(l-1)}[src]$ of the source node in the $(l-1)^{th}$ layer into the key-node vector $K^i(src_n)$ through K-linear-node according to the formula (3);

according to the formula (2), calculating a dot product value between $K^i(src_n)$ and $Q^i(dst_n)$, and dividing the dot product value by a square root of the node feature dimension d to obtain a node attention score $A_{head}^i$ for each attention head;

according to the formula (1), finally concatenating the attention score $A_{head}^i$ of each attention head, and performing softmax calculation to obtain an attention score $A_{head}^i(src, dst)$ of the node;

and similarly, obtaining an attention score Attention(src, e, dst) of the edge.

4. The method for detecting a complex multi-step attack in an electric power system according to claim 3, wherein the learning, by using a self-attention mechanism, neighbor information that contributes the most to a complex multi-step attack detection task comprises:

$$\text{Message}(src, dst) = \underset{i \in [1,m]}{\|} M^i_{head-node} \quad (8)$$

$$M^i_{head-node} = V - \text{linear} - \text{node}^i(H^{(l-1)}[src])W_n^M \quad (9)$$

$$\text{Message}(src, e, dst) = \underset{i \in [1,m]}{\|} M^i_{head-edge} \quad (10)$$

$$M^i_{head-edge} = V - \text{linear} - \text{edge}^i(H^{(l-1)}[e])W_e^M \quad (11)$$

wherein $M_{head-node}^i$ represents a value-node vector of the $i^{th}$ attention head of the node feature, $M_{head-edge}^i$ represents a value-edge vector of the $i^{th}$ attention head of the edge feature, V-linear-node$^i$ represents a linear layer for mapping the feature of the source node, V-linear-edge$^i$ represents a linear layer for mapping the feature of the edge, $W_n^M$ represents a weight matrix of a value-node vector of the node feature, $W_e^M$ represents a weight matrix of an edge-node vector of the edge feature, Message(src, dst) represents a concatenating representation of value-node vectors of m attention heads, Message(src, e, dst) represents a concatenating representation of value-edge vectors of the m attention heads, $H^{(l-1)}[src]$ represents the embedding representation of the source node in the $(l-1)^{th}$ layer, and $H^{(l-1)}[e]$ represents the embedding representation of the edge in the $(l-1)^{th}$ layer;

linearly mapping the feature $H^{(l-1)}[src]$ of the source node through V-linear-node$^i$ according to the formula (9), and allocating different weight matrices WM to different types of source nodes to obtain a value-node vector $M_{head\text{-}node}^i$ of an attention head; and concatenating value-node vectors $M_{head\text{-}node}^i$ of all the attention heads according to the formula (8) to obtain the concatenating representation Message(src, dst) of the value-node vectors of the attention heads; and similarly, obtaining the concatenating representation Message(src, e, dst) of the value-edge vectors of the attention heads.

5. The method for detecting a complex multi-step attack in an electric power system according to claim 4, wherein a specific calculation process of aggregating the neighbor information to obtain the second node embedding representation as the input data is as follows:

$$H^i[dst] = \bigoplus_{\forall src \in N(dst)} (\text{Attention}(src, dst) \cdot \text{Message}(src, dst), \quad (12)$$
$$\text{Attention}(src, e, dst) \cdot \text{Message}(src, e, dst))$$

wherein $H^i[dst]$ represents a second node embedding representation of the destination node in an $l^{th}$ layer;

aggregating neighbor information of the destination node by using an attention weight coefficient according to the formula (12), and calculating a dot product value between the node attention score Attention(src, dst) and the concatenating representation Message(src, dst) of the value-node vectors of the attention heads;

calculating a dot product value between the edge attention score Attention(src, e, dst) and the concatenation representation Message(src, e, dst) of the value-edge vectors of the attention heads; and accumulating all product results to obtain the second node embedding representation of the destination node.

6. The method for detecting a complex multi-step attack in an electric power system according to claim 5, wherein the complex multi-step attack detection module takes the second node embedding representation as an input, and obtains the attack detection result in a binary classification form through the linear layer and a softmax layer.

7. A system for detecting a complex multi-step attack in an electric power system, comprising:

a data collection module configured to collect interaction behavior data of a network entity;

a data processing module configured to preprocess the interaction behavior data of the network entity based on a heterogeneous graph to obtain input data; and an attack detection module configured to input the input data into a complex multi-step attack detection module to obtain an attack detection result;

wherein the preprocessing the interaction behavior data of the network entity based on a heterogencous graph comprises:

extracting information from the interaction behavior data of the network entity to construct a node and an edge, which comprises establishing the heterogeneous graph by using cach of a user, a host, a file, and a website in the interaction behavior data of the network entity as the node and using a connection relationship between nodes as the edge;

firstly defining a concept of the heterogeneous graph by using a source IP address as a source node, a destination IP address as a destination node, and a connection relationship between the source node and the destination node as the edge, wherein a meta relationship is represented by a triplet of <source node, edge, destination node>; there are a plurality of types of source nodes, destination nodes, and edges; a timestamp of event occurrence time is allocated to cach triplet to reflect a dynamic feature, thereby forming a quadruple notation of <source node, edge, destination node, timestamp>; and specifically, following content is comprised:

extracting information from the interaction behavior data of the network entity to construct node types and edge types, wherein the node types comprise the user, the host, the file, and the website, and the edge types comprise logging in to the host by the user, logging out of the host by the user, opening the file by the host, writing the file by the host, uploading the file to the website, downloading the file from the website, and accessing the website by the user; and extracting information from the interaction behavior data of the network entity to construct a node feature and an edge feature, wherein node features of the user comprise a username, a user group, and a user mailbox; node features of the host comprise a device ID of the host, a device model of the host, a region of the host, and a quantity of times that a USB flash disk of the host is used; node features of the file comprise file creation time, file modification time, a file type, and a file name; and edge features of logging in to the host by the user and logging out of the host by the user comprise an authentication status code, an authentication event, and an authentication type; and determining that final input data is related features and timestamp information of the destination node and an adjacent source node of the destination node, wherein the input data is in a form of <ID of the source node, ID of the destination node, type of the source node, type of the destination node, feature of the source node, feature of the destination node, edge type, edge feature, timestamp>;

inputting the timestamp information of the destination node and the adjacent source node of the destination node in the heterogeneous graph into a Time2Vec layer to obtain a first time embedding representation, which comprises:

taking the destination IP address in a network behavior log as the destination node and the source IP address in the network behavior log as the source node, and subtracting the timestamp information of the source node adjacent to the destination node from the timestamp information of the destination node to obtain a time difference sequence; representing the source node src and its corresponding timestamp ts by T(src@ts), and the destination node dst and its corresponding timestamp td by T(dst@td); and calculating a relative time interval according to $\Delta T(dst@ts, src@td)=T(dst@ts)-T(src@td)$, wherein the relative time interval is represented by the time difference sequence $\Delta T$;

inputting the time difference sequence into the Time2Vec layer to obtain a time representation in a form of an embedding vector, inputting the $\Delta T$ into the Time2Vec layer to obtain first time embedding representations of the source node and the destination node at a current time point, and inputting the embedding vector into a linear layer to linearly map the embedding vector back to an original dimension as a time feature of the destination node, in other words, the first time embedding representation; and inputting data that fuses node feature information and the first time embedding representation into a Heteformer layer, wherein a Heteformer is a deep learning model for processing the heterogeneous graph; the Heteformer layer is used to extract semantic information contained in a heterogeneous node and a heterogeneous edge in the heterogeneous graph to form a node embedding representation for each node, and provide an input for a downstream task; a specific calculation process of the Heteformer layer comprises: allocating different weights based on different node types and edge types, learning, by using a self-attention mechanism, neighbor information that contributes the most to a complex multi-step attack detection task, and aggregating the neighbor information to obtain a second node embedding representation as the input data.

\* \* \* \* \*